United States Patent [19]

Vissers et al.

[11] 3,933,521

[45] Jan. 20, 1976

[54] ANODE FOR A SECONDARY, HIGH-TEMPERATURE ELECTROCHEMICAL CELL

[75] Inventors: Donald R. Vissers, Naperville; Benjamin S. Tani, Chicago, both of Ill.

[73] Assignee: The United States of America as represented by the United States Energy Research and Development Administration, Washington, D.C.

[22] Filed: Feb. 13, 1975

[21] Appl. No.: 549,635

[52] U.S. Cl.............. 136/6 LF; 136/20; 136/100 R
[51] Int. Cl.².................. H01M 43/00; H01M 35/00
[58] Field of Search.......... 136/6 LF, 6 R, 20, 83 R, 136/100 R, 120 R, 36, 75, 155; 204/48

[56] References Cited
UNITED STATES PATENTS

| | | | |
|---|---|---|---|
| 3,716,409 | 2/1973 | Cairns et al. ....................... | 136/6 R |
| 3,791,867 | 2/1974 | Broadhead et al. .................. | 136/6 R |
| 3,887,396 | 6/1975 | Walsh et al. ........................ | 136/6 L |

*Primary Examiner*—Anthony Skapars
*Attorney, Agent, or Firm*—Dean E. Carlson; Arthur A. Churm; Hugh W. Glenn

[57] ABSTRACT

A high-temperature, secondary electrochemical cell includes an anode containing lithium, an electrolyte containing lithium ions and a cathode containing a chalcogen material such as sulfur or a metallic sulfide. The anode includes a porous substrate formed of, for instance, a compacted mass of entangled metallic fibers providing interstitial crevices for receiving molten lithium metal. The surfaces of the interstitial crevices are provided with a coating of cobalt metal to enhance the retention of the molten lithium metal within the substrate.

10 Claims, 3 Drawing Figures

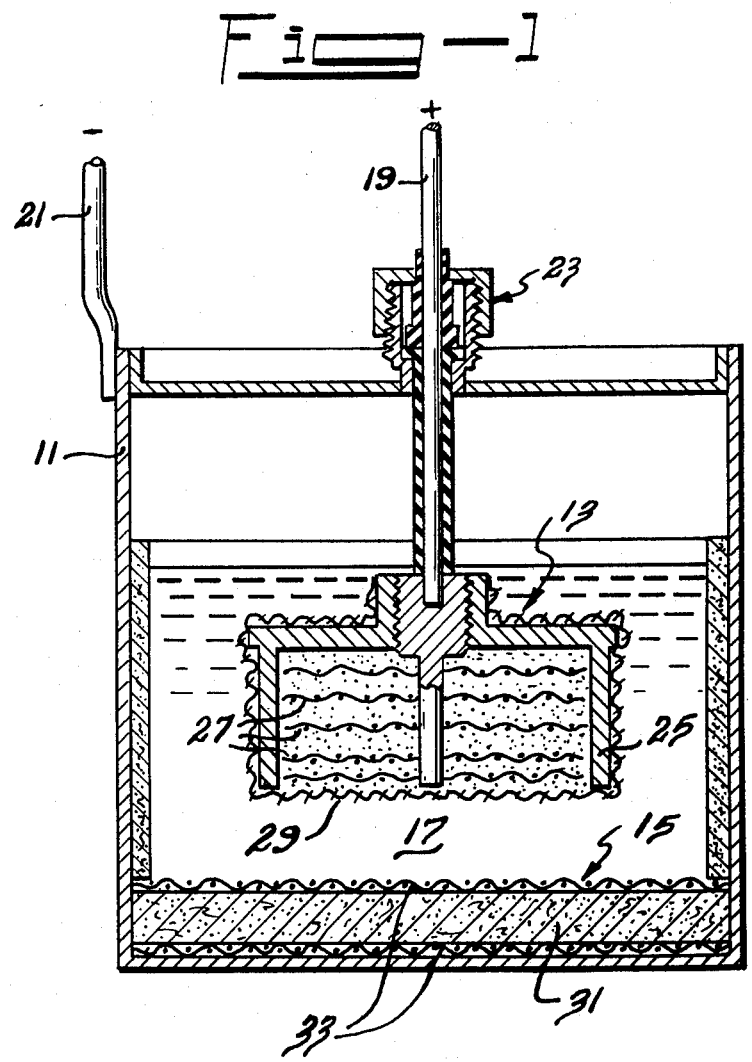

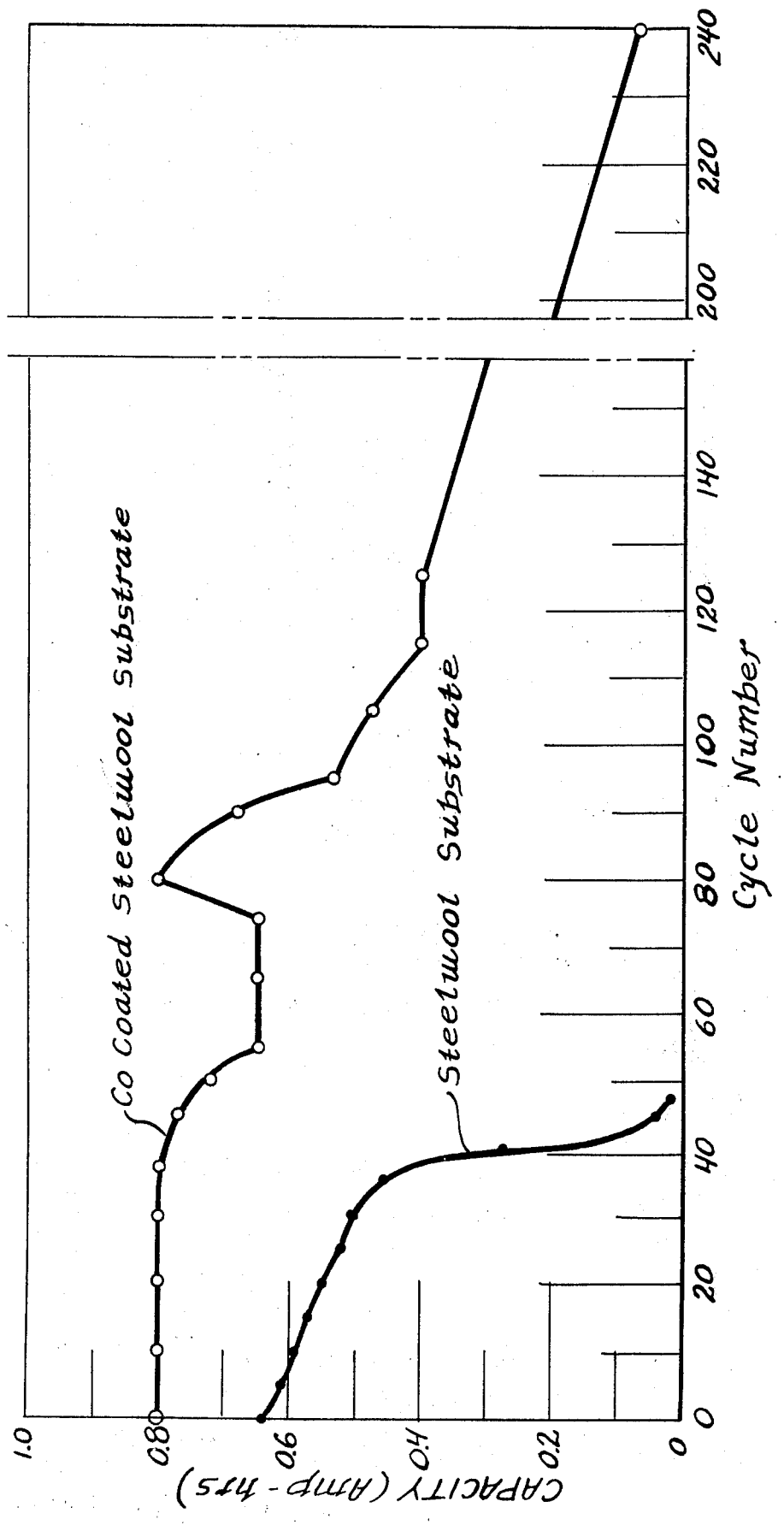

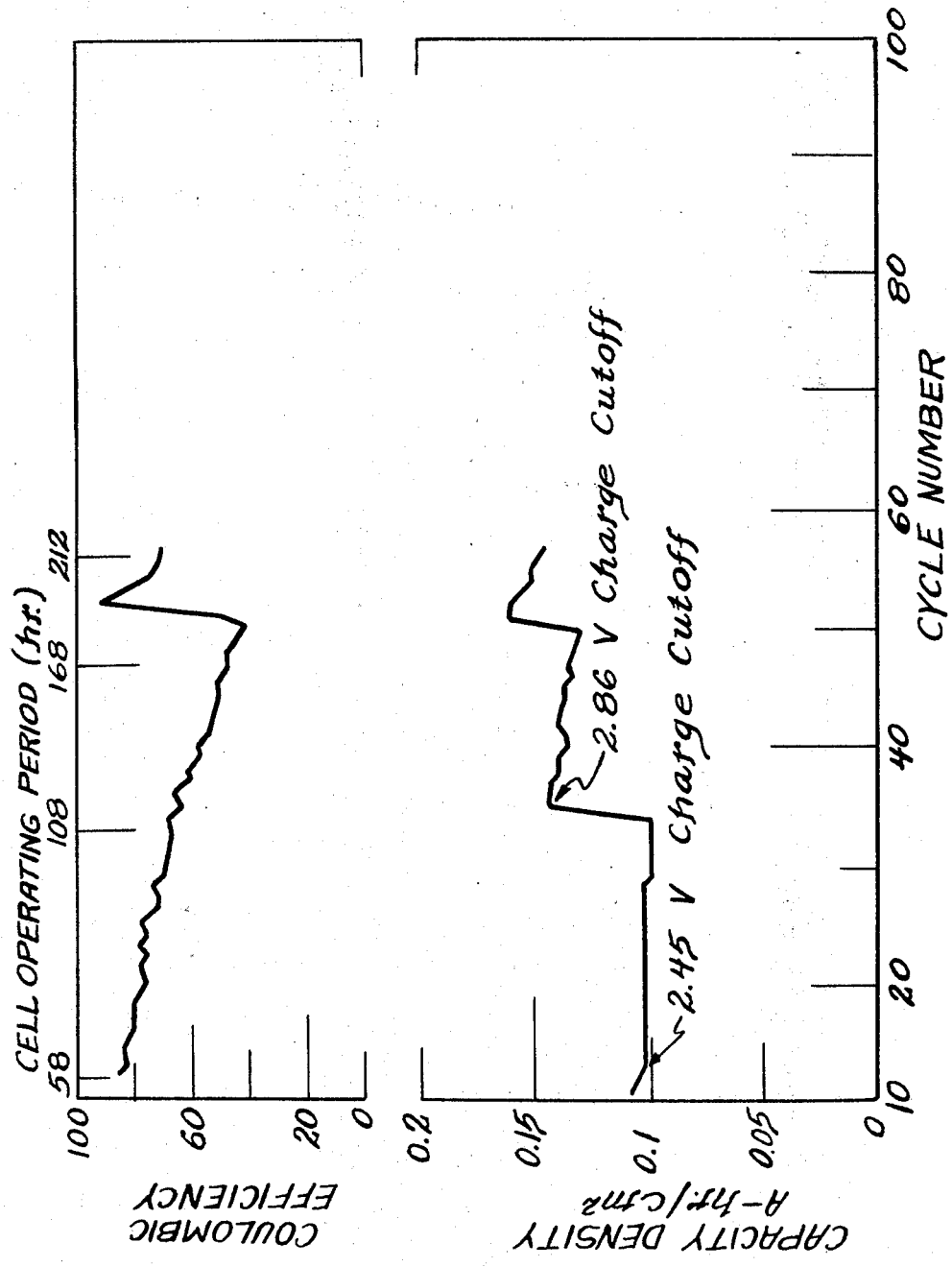

ANODE FOR A SECONDARY, HIGH-TEMPERATURE ELECTROCHEMICAL CELL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to secondary electrochemical, power-producing cells that are capable of providing high current densities, high capacity densities and long cycle lives. In more detail, the invention relates to a high-temperature cell that employs molten lithium metal as an anode reactant and a chalcogen such as sulfur or a metallic sulfide as the cathode reactant. The cell includes an improved anode (negative electrode) that exhibits good retention of molten lithium metal during cycling.

A substantial amount of work has been done in the development of electrochemical cells for applications requiring a high specific energy (watt hours per kilogram; W-hr/kg) and a long cycle life (number of charge/discharge cycles before failure). One such application is a battery power source for an electrically powered vehicle. For such an application, the high specific energy requirement must be achieved without sacrificing peak specific power (watts per kilogram; W/kg). Depending upon the design and materials of an electric passenger vehicle, a range approaching 200 miles and an acceptable acceleration capability would require a battery having a specific energy of at least 200 W-hr/kg and a specific power of at least 200 W/kg.

One class of cells that show promise for development of high-specific-energy, high-specific-power secondary batteries are those that operate at elevated temperatures with molten electrolyte. These cells employ lithium or sodium anodes and cathode materials of group VI or VII of the periodic table, the chalcogens and halogens. Of these cells, the lithium/sulfur cell having electrolyte containing lithium ions has proven to be very promising. Examples of such cells are given in U.S. Pat. Nos. 3,827,910 to Cairns et al., entitled "Homogeneous Cathodoe Mixtures for Secondary Electrochemical Power Producing Cells", Aug. 6, 1974, and 3,716,409 to Cairns et al., entitled "Cathodes for Secondary Electrochemical Power Producing Cells", Feb. 13, 1973; both assigned to the assignee of the present application.

In some cells the positive electrode employs a metallic sulfide as opposed to elemental sulfur as the reactant. Such cells are illustrated in U.S. patent application Ser. No. 434,459, filed Jan. 18, 1974, entitled "Cathode for a Secondary Electrochemical Cell", to Gay et al. In addition, various types of anode materials such as lithium-aluminum alloy and molten mixtures of lithium and other metallic additives have been investigated in attempts to achieve stability of the anode with cycling.

In order to maximize both specific energy and specific power of a given electrochemical cell, elemental lithium is a preferred choice for an anode reactant material due to its extremely low electronegativity and low equivalent weight. However, substantial problems have arisen in providing an anode structure or substrate capable of retaining lithium metal charge with cycling.

One material that has proven reasonably successful as an anode substrate and current collector is a porous stainless steel matrix having about 80 to 90% void volume and about 65 to 70 microns average pore size. This material can be composed of a random array of stainless steel fibers compressed in a random fashion and sintered at high temperatures, thereby creating a porous metal. Stainless steel Feltmetal (a trademark) is a commonly available material that has been employed with some success as a porous substrate for retaining molten lithium metal in electrochemical cells.

A continuing effort is being carried out to find improved anode substrate materials. High current densities ($mA/cm^2$) are necessary to achieve high power densities. At current densities of about 200 $mA/cm^2$ and above, which probably will be required for acceptable operation of an electric vehicle for personal and family transportation, the problem of lithium loss from the anode is intensified. In the continuing search for improved materials and components that will meet these problems, it is also desirable that less complex and more inexpensive materials be found to provide a power source for an electric vehicle that is economically attractive.

SUMMARY OF THE INVENTION

It is therefore an object of the present invention to provide an improved anode structure for use in a high-temperature secondary electrochemical cell.

It is a further object to provide an anode structure having improved lithium retention characteristics at high current densities.

It is also an object of this invention to provide a method of preparing an anode including molten lithium metal that can be used with reduced lithium loss within a high-temperature secondary electrochemical cell.

In accordance with the present invention, an improved anode is presented for use within a secondary electrochemical cell at high temperatures. The cell also includes a cathode containing a chalcogen material, such as sulfur or a sulfur compound, and a molten electrolyte between the two electrodes. The anode comprises a porous base structure with a cobalt coating over surfaces of open interstitial crevices. Molten lithium metal is sorbed within the porous base structure and exhibits good retention with cycling due to contact between the molten lithium and the cobalt coating.

The improved anode is prepared by cleaning a mass of metallic wool that is made up of randomly entangled metallic fibers. The cobalt metal coating is deposited onto these fibers while they are in a loosely structured or expanded condition to insure coating of all surfaces. The coated metallic wool is then compacted into a porous substrate and impregnated by soaking within molten lithium metal.

BRIEF DESCRIPTION OF THE DRAWINGS

The present invention is illustrated in the accompanying drawings wherein

FIG. 1 is an elevation view in cross section of an experimental cell used to demonstrate the present invention.

FIG. 2 is a graph of capacity in amp-hours v the charge/discharge cycles for the two laboratory cells described in Example I.

FIG. 3 is a graph showing capacity density in amp-hrs/$cm^2$ and the coulombic efficiency v charge/discharge cycle for the electrochemical cell described in Example II.

DETAILED DESCRIPTION OF THE PREFERRED EMBODIMENT

Referring now to FIG. 1 where an electrochemical cell is illustrated having a housing 11 containing a cathode (positive electrode) 13, an anode (negative electrode) 15 both submersed in a molten electrolyte 17. Electrical leads 19 and 21 provide connections to the negative and positive electrodes as shown. Lead 19 passes through a compressiontype seal 23 into contact with cathode 13 while electrical connection to the anode is provided by lead 21 attached to housing 11.

Cathode 13 is shown immersed in molten electrolyte 17 above anode 15. The cathode includes an electrically conductive support structure 25 and a plurality of electrically conductive screens or mesh 27 which serve as current collectors. The current collector mesh 27 is provided in a parallel stack across the cathode 13 with the open spaces filled with a cathode reactant material. The cathode reactant material includes a calcogen such as sulfur, selenium or tellurium. Preferably, sulfur or sulfur compounds, such as $FeS_2$, FeS, $CoS_2$, $Cu_2S$ or mixtures thereof are employed. Various other suitable metallic sulfides are listed in the assignee's copending application Ser. No. 434,459, entitled "Cathode for a Secondary Electrochemical Cell" to Gay et al., filed Jan. 18, 1974.

Surrounding the cathode structure is an electrically insulated and porous cloth 29. The cloth can be of boron nitride, calcium zirconate, yttria or other suitable, porous and electrically insulated fabric. Its purpose is to retain the cathode materials and to prevent electrical contact between the cathode and anode should the cell components swell or otherwisee move into physical contact. In some cells of this type, particularly where boron nitride cloth is used, a second interelectrode separator (not shown) of such as a calcium zirconate coated molybdenum screen can be interposed between the two electrodes.

In practice, various cell designs may be used with the improved anode of the present invention. The cell of FIG. 1 merely represents an example of the type cell used experimentally to test and prove the operability of the present invention. One other and perhaps more practical cell design which could be used in making up electrochemical batteries for off-peak storage of electrical power or as a power source for an electric vehicle is illustrated and described in the assignee's copending patent application entitled "Modular Electrochemical Cell" to Walsh et al., filed Nov. 15, 1973, Ser. No. 416,311, now U.S. Pat. No. 3,887,396.

In FIG. 1, anode 15 is shown disposed at the bottom of cell housing 11 slightly spaced from and in parallel alignment with cathode 13. The anode comprises a porous substrate 31 that is structurally supported on its top and bottom surfaces by metallic screens or mesh 33. As an optional feature, additional porous substrate material 35 can be placed along and in electrical contact with the vertical walls of housing 11. At the cell operating temperature (about 400°C.) porous substrate 31 is filled or impregnated with molten lithium metal or a molten combination or alloy of lithium and an additive metal such as copper.

Screens 33 are of an electrically conductive material that is preferably wetted by molten lithium to enhance its retention. For example, about 20 U.S. standard mesh stainless steel or about 20 U.S. standard mesh mild carbon steel screen could be employed. Where carbon steel screens of low alloy content are employed, it is preferable that they be coated with a layer of cobalt metal in a similar manner as will be described hereinbelow in conjunction with the porous substrate 31.

Porous substrate 31 is made up of a porous base structure with open and interconnected interstitial crevices. The base structure is of an electrically conductive material that is a suitable base for accepting a cobalt metal coating. As examples, porous iron, low alloy carbon steel, stainless steel or nickel can be used. The form of the base structure is preferably one that can be provided in an expanded condition for receiving the cobalt coating and subsequently compacted to form a porous substrate of 80% to 90% void volume (porosity) with open and interconnected, interstitial crevices coated with cobalt metal on essentially all surfaces. An entangled, fibrous, metallic mass is particularly suitable for this purpose. Other forms of the base structure might also include metallic foam, metallic felt, sintered masses of fibers or particles, stacks of metallic screens, or spiraled metallic ribbon.

In order to form porous substrate 31, the surfaces of the interstitial crevices, passageways or opening within the porous base structure are coated with a thin layer of cobalt metal. Essentially all of these surfaces are coated in order to provide maximum contact of molten lithium metal with the solid cobalt coating at the cell operating temperature. This contact is believed to provide a solid alloy with small amounts of lithium dissolved into the solid cobalt coating, thus enhancing wetting by the lithium metal and its retention within the porous substrate 31.

A strongly bonded cobalt coating can be applied to the porous substrate by electroplating or electrodepositing from an aqueous solution. In order to insure a uniform and complete coverage of the base structure, the electroplating is performed with the base structure in an expanded or noncompacted form. For example, where entangled fibrous material such as steel wool is employed as the base structure, the pads can be slightly fluffed or pulled apart to a void volume of about 99% prior to the deposition of cobalt metal. The deposition process is continued until a sufficient coating thickness is produced to provide a thorough covering of the complete base structure. Coating thicknesses of about 2–12 microns with a minimum of about 5% of the fiber diameter are used.

Although not presently tried, it is reasonable to assume that other processes involving decomposition of cobalt containing vapors could also be used in providing cobalt coatings on porous base structures. As an example, cobalt carbonyl, $Co(CO)_4$, vapor could be thermally decomposed to provide a cobalt layer on a heated substrate. A method similar to that described in U.S. Pat. No. 3,833,421 to Rubishko et al. entitled "Secondary Electrochemical Cells with a Chalcogen Cathode", Sept. 3, 1974, could be used. This patent described the application of a chromium coating within a porous graphite substrate by the thermal decomposition of dicumene chromium $(Cr[C_6H_5CH(CH_3)_2]_2$.

In selecting a porous based structure, inexpensive and commercially available steel wool appears to be a good choice. Steel wool of stainless steel or carbon steel can be selected from any of the steel wool classes listed below in Table I.

TABLE I

| Class | Mean Diameter (Microns) | Weight g/m | Surface Area cm²/g |
|---|---|---|---|
| 00 | 43.2 | 0.0113 | 120 |
| 0 | 50.8 | 0.0157 | 102 |
| 1 | 55.9 | 0.0189 | 92.8 |

A high surface area in the substrate is desirable for good lithium retention, thus making the finer fibers the preferred choice so long as a class so fine as to be excessively frangible is not selected.

In one manner of electroplating a cobalt coating onto an entangled mass of metallic fiber, such as steel wool of carbon steel, the base structure is first cleaned in accordance with well-known and documented cleaning procedures. One suitable procedure given in Hampel, *The Encyclopedia of Electrochemistry*, 549, Reinhold Publishing Corp., New York, 1964, is as follows:

1. Soak in 2 M NaOH at 80°–95°C. for 2 to 4 min.
2. Rinse in cold running water for 30 sec.
3. Pickle in 30% by volume HCl for 60 sec.
4. Rinse in running water for 30 sec.
5. Anodic electroclean with 2 M NaOH at 80°–95°C. for 1 to 2 min.
6. Rinse in cold running water for 30 sec.
7. Acid dip in 5% by volume HCl for 30 sec.
8. Rinse in cold running water for 30 sec.
9. Rinse with methyl alcohol and dry.

As is well known, cobalt can be plated onto various metallic substrates from plating baths of the double salts of cobalt-ammonia, cobalt-fluoborate, cobalt-sulfamate and cobalt-sulphate-chloride. In providing a crack-free deposit, pH, temperature, current densities, brighteners and mineral additives must be closely followed and considered.

As an example of a plating bath that has been employed in providing cobalt-coated substrates for use in experimental cells, the following composition is presented:

| | |
|---|---|
| $CoSO_4 \cdot 7H_2O$ | 300 g/liter |
| $CoCl_2 \cdot 6H_2O$ | 30 g/liter |
| $H_3BO_3$ | 40 g/liter |
| Sodium laurylsulfate (10% solution) | 1 cc/liter |

The following brighteners are also included:

| | |
|---|---|
| glyoxal (30% solution) | 1 cc/liter |
| $FeSO_4$ | 12 g/liter |
| $ZnSO_4$ | 1 g/liter |

A mass of loose noncompacted steel wool with a void volume of about 98.5 to 99.5% is electroplated by submerging it in a solution of this type along with a bar or the suitable supply of cobalt metal to replenish cobalt ions in solution. The submersed cobalt metal and steel wool are connected as electrodes at appropriate polarity to a source of electrical potential and an electroplating current of 2–20 mA/cm², based on the surface area of the steel wool fibers, is passed through the solution at a pH of about 1.5 to 3.5. It is of importance to begin the electroplating at a low current density, e.g. 2 to 4 mA/cm², in order to provide a uniform, crack-free deposit over all surfaces of the metallic fibers. Subsequent increases in current up to, for instance, 20 mA/cm² will provide a rougher semibright surface that is of value in enhancing wetting and retention of the molten lithium metal within the anode.

The following examples are presented to illustrate electrochemical cells operated with the improved anode of the present invention.

EXAMPLE I

Two experimental electrochemical cells were set up, each having two nearly identical electrodes of molten lithium metal impregnated into a porous substrate. This experimental work is also reported in "Development of High-Specific-Energy Batteries for Electric Vehicles", Progress Report for the Period August 1973 — January 1974, ANL-8058, 1974, and "High-Energy Battery Program at Argonne National Laboratory", ANL-8064, 1974. The cells were operated at about 400°C. with the eutectic of LiCl-KCl employed as an electrolyte between the two lithium electrodes.

In the first cell, each of the two electrode substrates was a small pad of class 0 carbon steel wool with cobalt coating of about 6 microns on the steel fibers. Each pad was about 1.1 cm², 0.21 cm thick and had a mass of about 0.24 gram, one-third of which was cobalt plating and the remainder steel wool fiber. Each pad had a total surface area of fibers of about 22 cm². As described above, the substrates were electroplated with cobalt metal while expanded to about 99% void volume and compacted to about 85% void volume between two 20 U.S. standard mesh screens of carbon steel that were also cobalt plated. The porous substrates were submersed in molten liquid metal whereby each sorbed approximately 0.28 gram of lithium. Each of these loaded substrates was then electrochemically discharged to about 50% capacity to a reference aluminum electrode. The partially discharged lithium electrodes were then reassembled into an experimental Li/LiCl.KCl/Li cell and electrochemically cycled to evaluate the lithium retention properties of the lithium electrode porous substrates.

During the first 37 cycles of the first cell operation, approximately 80% of the electrode capacity was transferred successfully in each half cycle at a current density of 400 mA/cm with coulombic efficiencies (discharge as a percentage of charge) greater than 98%. After the 37th cycle, the quantity of lithium transferred in each half cycle began to decrease, reaching a value of 0.64 A-hr by the 70th cycle and 0.4 A-hr by the 125th cycle. At the 75th cycle, the cutoff voltage for the charge of each electrode was increased from 0.09 volt to 0.12 volt to test the cell with essentially all of the lithium in the electrodes being cycled. Operation of the cell was terminated after 240 cycles (approximately 26 days) when the capacity had decreased fairly linearly since the 125th cycle to about 8% of its initial value. Throughout the entire test, the resistance of the cell remained nearly constant at 0.15 ± 0.02 ohm and the coulombic efficiency was generally over 95%.

In order to illustrate the improvement afforded by the cobalt coating on the steel wool substrate, the second and nearly identical Li/LiCl-KCl/Li cell was operated. The only substantial difference in the structure of the two cells was that the cobalt coating on the steel wool base structure was omitted and each electrode of the second cell consisted of molten lithium metal impregnated into compacted steel wool between two 20-mesh carbon steel screens. Approximately 0.24 gram of steel wool was used in each electrode to provide equal substrate mass in the two cells. This second cell was cycled the first few times at only 200 mA/cm² current density but after about 5 cycles was increased to the 400 mA/cm² as in the first cell. A slightly higher voltage of 0.16 to 0.2 was required to obtain these current densities at 100% transfer of lithium between the two electrodes. The cell capacity decreased gradually during the first 30 or so cycles and then decreased abruptly, losing more than 90% of its initial capacity by the 45th cycle. The total duration of the cycling test was approximately 4-½ days.

The graph of FIG. 2 is presented to clearly illustrate the improvement in cell capacity and cycle life that can be attributed to the application of a cobalt coating into the interstitial crevices of the porous base structure containing molten lithium metal reactant. This graph clearly shows the increased capacity and cycle life of the cell having the improved anode with a cobalt-coated substrate.

In neither of the above-described cells was the cycle life particularly long prior to substantial loss of capacity. However, the mode of operation in both cells was severe (e.g. 400 mA/cm² current density and near 100% discharge) in an attempt to induce failure. Furthermore, the cells were cycled unsealed within a furnace well having upper sections of reduced temperature that permitted condensation of potassium vapor produced by the reaction:

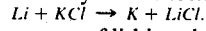
 $Li + KCl \rightarrow K + LiCl$.

This source of lithium loss from the electrodes could be minimized through use of a sealed cell and longer cycle life perhaps could be obtained.

EXAMPLE II

An electrochemical storage cell, ANL cell S-56, similar to that described and shown in FIG. 1 was assembled and operated to test a cobalt-coated substrate within the negative electrode. The cobalt-plated steel wool for this electrochemical cell was prepared in essentially the same manner as that for the laboratory cells described in Example I. Type 0 carbon steel wool was again employed and approximately 6 microns thickness of cobalt metal was electroplated onto the steel wool fibers. Two 20-mesh carbon steel screens with cobalt coatings were again used for support on either side of the steel wool substrate. Other physical design characteristics of the cell are given below in Table II:

TABLE II

| Negative Electrode* | |
|---|---|
| Li-25 wt % Cu, g | 23.7 |
| Electroylte | LiF—LiCl—KCl |
| Positive Electrode | |
| Area, cm² | 42.7 |
| Active Material | FeS₂ + Li₂S |
| Weight, g | 19.4 |
| Comp., wt % | |
| FeS₂ | 33.5 |
| Li₂S | 26.6 |
| Electrolyte | 32.5 |
| Carbon Black | 6.6 |
| Fe | 0.8 |
| Theoretical Capacity Density, A-hr/cm² | 0.28 |
| Theoretical Specific Capacity, A-hr/kg | 23.8 |
| Theoretical Capacity per Unit Volume of Sulfur Electrode, A-hr/cm³ | 0.41 |
| Interelectrode Distance, cm | 0.60 |

*A cobalt-coated steel wool substrate was used in contact with the bottom of the cell housing and stainless steel Feltmetal, 90% porosity, was used in contact with the cylindrical wall. The initial charge of lithium was sorbed only into the cobalt-coated substrate.

This cell was operated for over 65 cycles and 250 hours when it was voluntarily terminated. During this operating period, the cell was charged and discharged at a rate of 0.1 A/cm² based on the positive electrode area. FIG. 3 shows the capacity density and the coulombic or amp-hr efficiency over a substantial portion of the cell life. At a charge cutoff voltage of 2.45 volts (IR included), a capacity density of about 0.11 A-hr/cm² (38.7% of the theoretical capacity density based on positive electrode area) was measured to a 1.0 volt cutoff (IR included). The charged cutoff voltage was increased to 2.86 volts at about the 35th cycle with a resulting increase in the capacity density The coulombic efficiency decreased from 86% to 40% during the first 168 hours and 50 cycles. This was a result of electrolyte escape from the cell. On replacing the electrolyte, the cell performance increased substantially, as is shown in FIG. 3.

The results of this experimental electrochemical cell indicate that a cobalt-coated steel wool substrate can be employed for good retention of molten lithium metal within an electrochemical cell. The sustained levels of capacity density show that the lithium charge was being effectively cycled rather than lost from the substrate.

It can be seen from the above description and examples that the present invention provides a novel and improved anode structure for use in a high-temperature and high-capacity electrochemical cell. The anode structure can be a porous base structure of inexpensive carbon steel wool that is cobalt-coated to achieve improved retention of molten lithium metal. Although further improvements may still be required to provide a practical electrochemical cell for use within batteries for powering an electric vehicle or for off-peak storage of electrical energy, the present invention makes a substantial contribution towards enhanced cycle life and capacity of the electrochemical cells.

The embodiments of the invention in which an exclusive property or privilege is claimed are defined as follows:

1. In a secondary electrochemical cell comprising an anode containing lithium metal, a cathode containing a chalcogen material and an electrolytic salt between said anode and cathode, the improvement wherein said anode comprises a porous base structure with open interstitial crevices, cobalt coating on surfaces of said interstitial crevices and said lithium metal impregnated into said interstitial crevices in contact with said cobalt coating.

2. The improvement of claim 1 wherein said base structure is of an iron alloy and said cobalt coating is bonded to said base structure over essentially all surfaces of said interstitial crevices.

3. The improvement of claim 2 wherein an electrochemical bond affixes said cobalt coating to said base structure.

4. The improvement of claim 1 wherein said base structure comprises a plurality of entangled fibers of iron alloy having coatings of cobalt metal over essentially all outer surfaces and being compacted into a porous structure with a void volume of about 80 to 90%.

5. The improvement of claim 4 wherein said cobalt coating having a thickness in excess of 5% of the diameter of said fibers.

6. The improvement of claim 4 wherein said fibers having diameters of 40 to 60 microns and surface areas of 80 to 120 cm²/gram.

7. The improvement of claim 1 wherein said open interstitial crevices being impregnated with molten lithium metal and there being solid lithium-cobalt alloy in wetted contact with said lithium metal on the surface of said cobalt coating.

8. A method of preparing an anode for use within an electrochemical cell including said anode, a cathode and an electrolytic salt, said method comprising cleaning a mass of metallic wool comprising entangled metallic fibers, depositing a cobalt metal coating onto said metallic fibers, compacting said metallic wool to form a porous substrate, and sorbing molten lithium metal onto said porous substrate.

9. The method of claim 8 wherein said metallic wool is steel wool of carbon steel and said depositing of said cobalt coating being performed by electroplating cobalt onto fibers of said steel wool.

10. The method of claim 8 wherein said electroplating is performed onto said metallic wool in an extended condition of 98.5% to 99.5% void volume prior to compacting into a porous substrate having a void volume of 80 to 90%.

* * * * *